United States Patent
Katayose (10) Patent No.: US 11,002,944 B2
(45) Date of Patent: May 11, 2021

(54) OPTICAL SYSTEM AND IMAGE PICKUP APPARATUS

(71) Applicant: CANON KABUSHIKI KAISHA, Tokyo (JP)

(72) Inventor: Masato Katayose, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 16/277,094

(22) Filed: Feb. 15, 2019

(65) Prior Publication Data

US 2019/0265441 A1    Aug. 29, 2019

(30) Foreign Application Priority Data

Feb. 27, 2018 (JP) .............................. JP2018-032883

(51) Int. Cl.
*G02B 13/00* (2006.01)
*H04N 5/225* (2006.01)
(Continued)

(52) U.S. Cl.
CPC ....... *G02B 13/0045* (2013.01); *G02B 15/177* (2013.01); *H04N 5/2254* (2013.01);
(Continued)

(58) Field of Classification Search
CPC .............. G02B 15/173; G02B 27/0025; G02B 13/0045; G02B 15/177; G02B 15/163; G02B 5/005; H04N 5/2254
(Continued)

(56) References Cited

U.S. PATENT DOCUMENTS 9,645,353 B2 * 5/2017 Yamanaka ............... G02B 9/64
2003/0210476 A1 * 11/2003 Harada ................ G02B 27/646
359/754
(Continued)

FOREIGN PATENT DOCUMENTS

DE    2054976 A1    9/1971
JP    H111133300 A    5/1999
(Continued)

OTHER PUBLICATIONS

Notice of Reasons for Refusal issued by the Japanese Patent Office dated Jan. 7, 2020 in corresponding Japanese Patent Application No. 2018-032883, with English translation.

*Primary Examiner* — Evelyn A Lester
(74) *Attorney, Agent, or Firm* — Carter, DeLuca & Farrell LLP (57) ABSTRACT

Provided is an optical system consisting of, in order from an object side to an image side, a front lens group (FLG), an aperture stop and a rear lens group (RLG), in which FLG includes at least one positive lens and at least one negative lens. A focal length of a positive lens Lp arranged closest to object side among the at least one positive lens, a focal length of a negative lens Ln arranged closest to image side among the at least one negative lens, a distance on an optical axis from an object-side lens surface of positive lens Lp to aperture stop, a distance on optical axis from an object-side lens surface of negative lens Ln to aperture stop, and a distance on optical axis from aperture stop to a lens surface closest to image side in RLG when focused at infinity are appropriately set.

12 Claims, 9 Drawing Sheets

(51) Int. Cl.
   *G02B 15/177*   (2006.01)
   *G02B 15/173*   (2006.01)
   *G02B 15/163*   (2006.01)
   *G02B 27/00*    (2006.01)
   *G02B 5/00*     (2006.01)

(52) U.S. Cl.
   CPC ............ *G02B 5/005* (2013.01); *G02B 15/163* (2013.01); *G02B 15/173* (2013.01); *G02B 27/0025* (2013.01)

(58) Field of Classification Search
   USPC ........ 359/642, 683, 691, 717, 740, 793–795
   See application file for complete search history.

(56) References Cited

U.S. PATENT DOCUMENTS

| | | | |
|---|---|---|---|
| 2014/0176782 A1 | 6/2014 | Yokoyama | |
| 2016/0252706 A1* | 9/2016 | Yamanaka | G02B 13/005 359/754 |
| 2017/0336608 A1* | 11/2017 | Gyoda | G02B 7/09 |
| 2018/0180843 A1* | 6/2018 | Sakai | G02B 13/16 |
| 2018/0259690 A1* | 9/2018 | Yasui | G02B 27/4216 |
| 2018/0372993 A1 | 12/2018 | Katayose | |
| 2019/0079305 A1* | 3/2019 | Ichimura | G02B 27/16 |
| 2019/0113711 A1* | 4/2019 | Okuoka | G02B 9/12 |
| 2019/0113721 A1 | 4/2019 | Katayose | |
| 2019/0265439 A1* | 8/2019 | Mori | G02B 9/64 |
| 2019/0271830 A1* | 9/2019 | Mori | G02B 9/12 |

FOREIGN PATENT DOCUMENTS

| | | |
|---|---|---|
| JP | 2000330022 A | 11/2000 |
| JP | 2001091829 A | 4/2001 |
| JP | 2008064884 A | 3/2008 |
| JP | 2010266577 A | 11/2010 |
| JP | 2011013469 A | 1/2011 |
| JP | 2011053663 A | 3/2011 |
| JP | 2011237750 A | 11/2011 |
| JP | 2013088718 A | 5/2013 |
| JP | 2013218015 A | 10/2013 |
| JP | 2013218267 A | 10/2013 |
| JP | 2014059360 A | 4/2014 |
| JP | 2014235176 A | 12/2014 |
| JP | 2016061918 A | 4/2016 |

* cited by examiner

OPTICAL SYSTEM AND IMAGE PICKUP APPARATUS

BACKGROUND OF THE INVENTION

Field of the Invention

The present invention relates to an optical system and an image pickup apparatus.

Description of the Related Art

It is required of an image pickup optical system used with an image pickup apparatus using an image pickup element to achieve high image quality (high resolution), as well as to have good blur quality of an image. As an image pickup optical system that satisfies those requirements, an image pickup optical system having a large aperture ratio is known. An image pickup optical system that achieves a large aperture ratio has a shallow depth of field, and hence, in order to achieve the good blur quality while achieving the high image quality, it is required to satisfactorily correct chromatic aberration and other various aberrations.

In the related art, there have been proposed various image pickup optical systems having large aperture ratios and being configured to satisfactorily correct various aberrations including chromatic aberration.

In Japanese Patent Application Laid-Open No. 2013-218015, there is disclosed an optical system having a large aperture ratio and consisting of, in order from an object side to an image side, a first lens unit having a positive refractive power, and a second lens unit having a positive or negative refractive power, in which the first lens unit is configured to move during focusing.

In U.S. Patent Application Publication No. 2014/0176782, there is disclosed an imaging optical system having a large aperture ratio and consisting of, in order from an object side to an image side, a first lens unit having a positive refractive power, a second lens unit having a negative refractive power, an aperture stop, and a third lens unit having a positive refractive power, in which the second lens unit is configured to move during focusing.

In an optical system having a large aperture ratio, with a shallow depth of field, image quality of the entire image plane is significantly reduced unless various aberrations, such as axial chromatic aberration, lateral chromatic aberration, spherical aberration, coma, and astigmatism, are satisfactorily corrected. Moreover, when the aperture ratio is increased, an effective lens diameter and an outer diameter of an aperture stop are increased, and the entire system is increased in size.

When the outer diameter of the aperture stop becomes much larger, associated mechanisms also becomes disadvantageously larger in size, and hence the entire lens barrel becomes disadvantageously larger in size. In order to reduce the outer diameter of the aperture stop and effective diameters of lenses arranged near the aperture stop, to thereby downsize the entire system, it is effective to increase refractive powers of positive lenses arranged on the object side of the aperture stop, in particular, a refractive power of a positive lens arranged closest to the object side, for example. However, when the refractive powers of the positive lenses become much higher, spherical aberration and other various aberrations are increased, and it becomes difficult to satisfactorily correct various aberrations.

SUMMARY OF THE INVENTION

An optical system according to the present invention consists of, in order from an object side to an image side, a front lens group, an aperture stop and a rear lens group, in which the front lens group includes at least one positive lens and at least one negative lens, the at least one positive lens includes a positive lens Lp arranged closest to the object side among the at least one positive lens, and the at least one negative lens includes a negative lens Ln arranged closest to the image side among the at least one negative lens. The optical system satisfies the following conditional expressions:

$$1.0 < fLp/Dps < 2.0;$$

$$0.35 < Dps/Dsr < 0.85; \text{ and}$$

$$-10.0 < fLn/Dns < -3.0,$$

where fLp represents a focal length of the positive lens Lp, fLn represents a focal length of the negative lens Ln, Dps represents a distance on an optical axis from a lens surface on the object side of the positive lens Lp to the aperture stop, Dns represents a distance on the optical axis from a lens surface on the object side of the negative lens Ln to the aperture stop, and Dsr represents a distance on the optical axis from the aperture stop to a lens surface closest to the image side in the rear lens group when the optical system is focused at infinity.

Further features of the present invention will become apparent from the following description of exemplary embodiments with reference to the attached drawings.

DESCRIPTION OF THE EMBODIMENTS

Now, an optical system and an image pickup apparatus according to Examples of the present invention are described with reference to the drawings.

The optical system according to Examples of the present invention consists of, in order from an object side to an image side, a front lens group having a positive refractive power, an aperture stop, and a rear lens group. The front lens group, the aperture stop, and the rear lens group form a plurality of lens units, in which an interval between each pair of adjacent lens units is changed during focusing. Moreover, the front lens group includes at least one positive lens and at least one negative lens.

Figure 1:
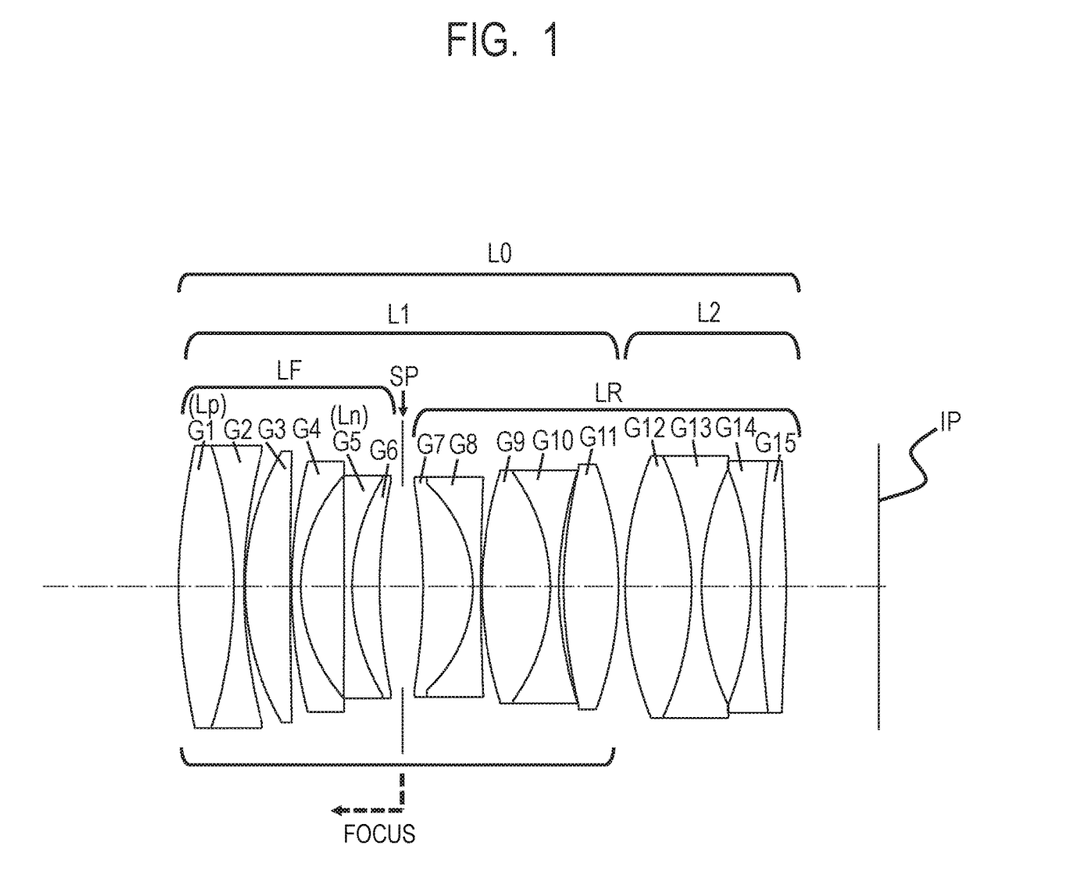
FIG. 1 is a lens cross-sectional view of an optical system according to Example 1 of the present invention.
Figure 2A:
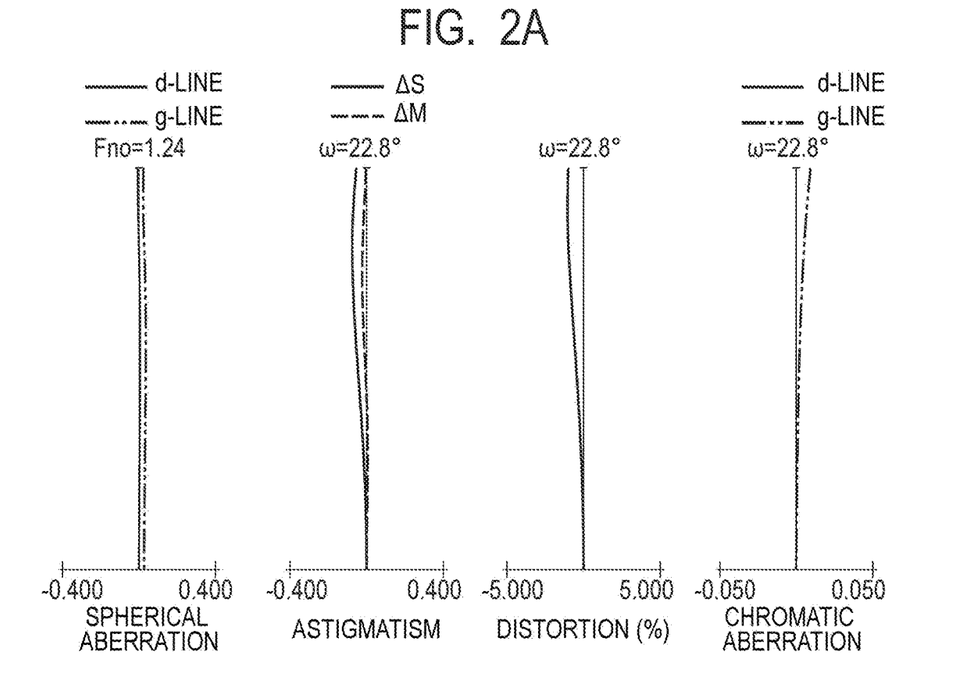
FIG. 2A is an aberration diagram of the optical system of Example 1 when focused at infinity.
Figure 2B:
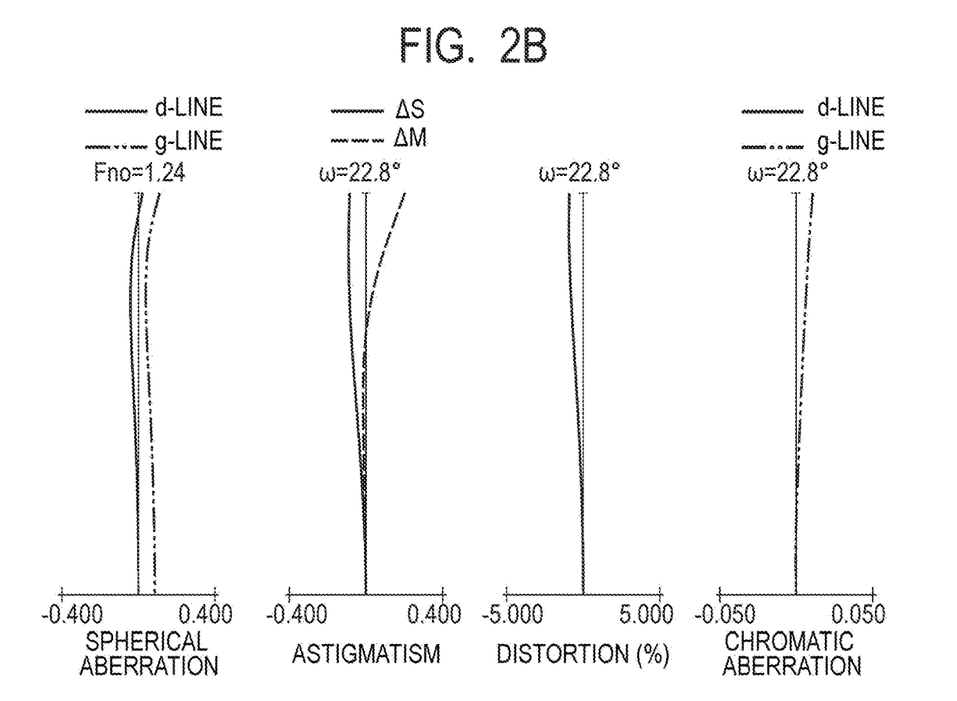
FIG. 2B is an aberration diagram of the optical system of Example 1 when focused at the closest distance.

FIG. 1 is a lens cross-sectional view of an optical system according to Example 1 of the present invention. FIG. 2A and FIG. 2B are aberration diagrams of the optical system of Example 1 when focused at infinity and when focused at the closest distance, respectively. The term "the closest distance" in this example is when an image pickup magnification is −0.16. Example 1 relates to an optical system having an F-number of 1.24 and an image pickup angle of view of 45.58°.

Figure 3:
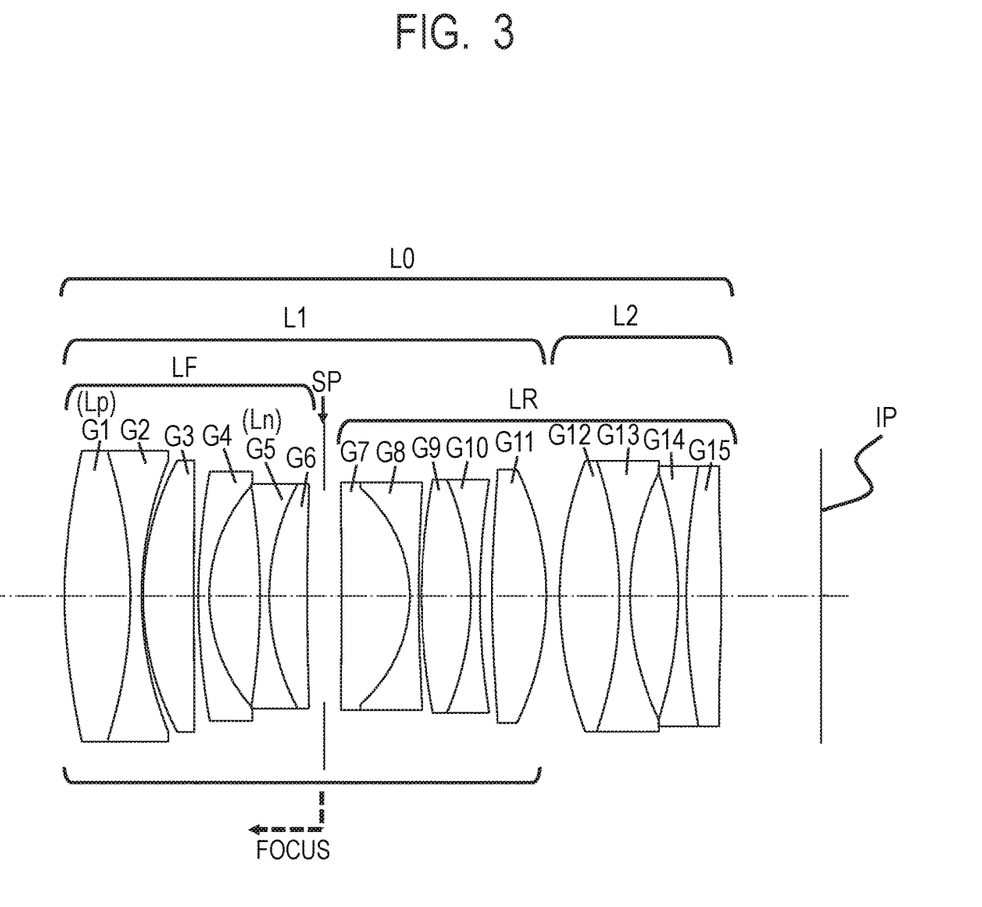
FIG. 3 is a lens cross-sectional view of an optical system according to Example 2 of the present invention.
Figure 4A:
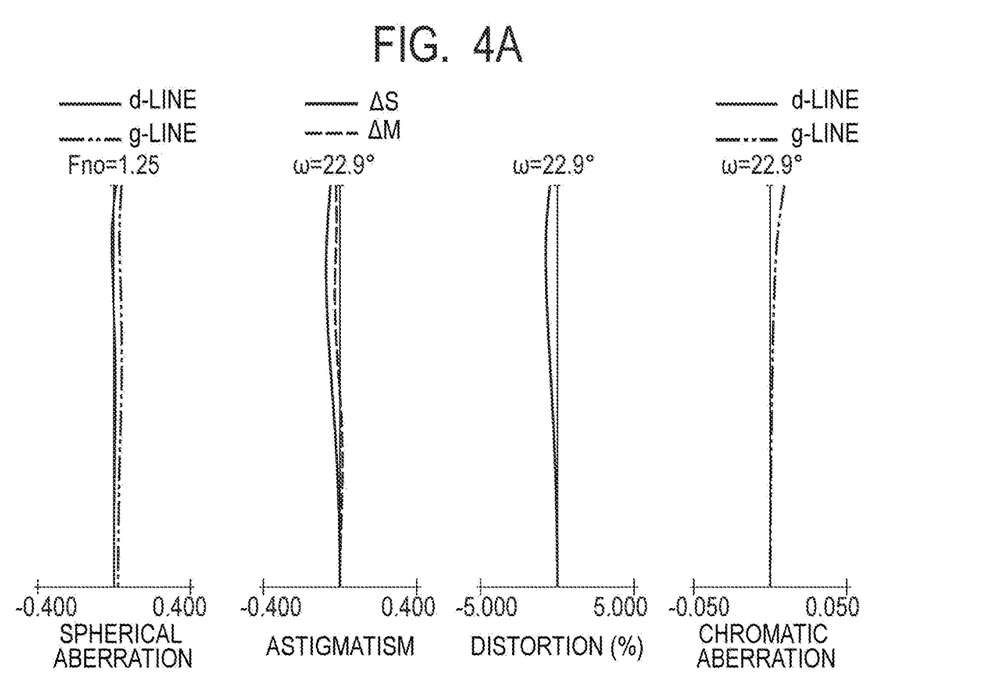
FIG. 4A is an aberration diagram of the optical system of Example 2 when focused at infinity.
Figure 4B:
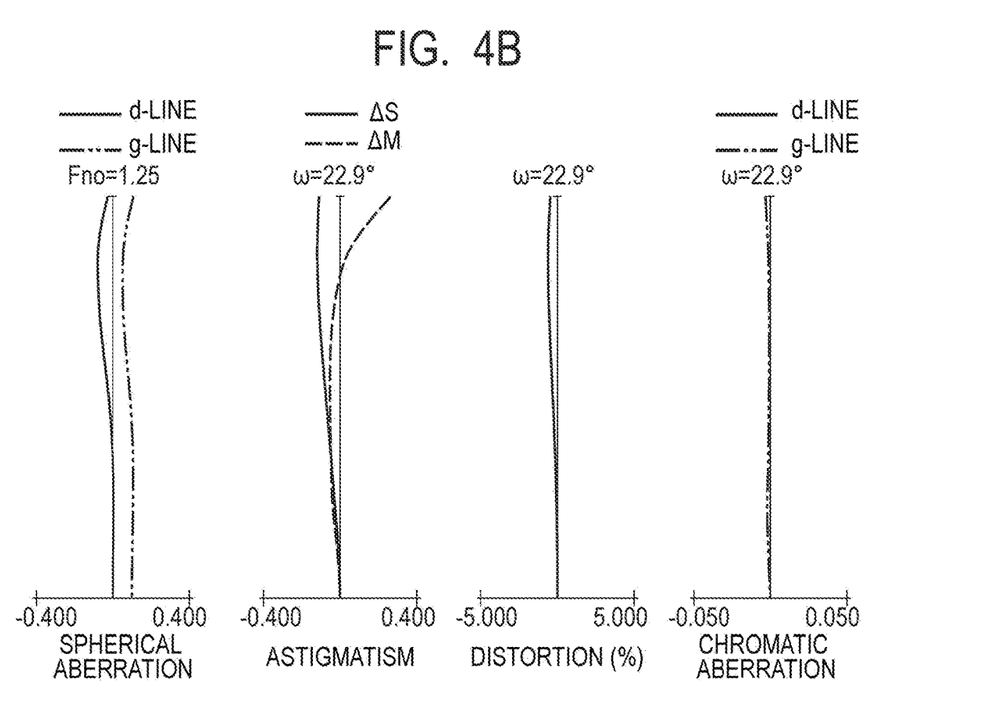
FIG. 4B is an aberration diagram of the optical system of Example 2 when focused at the closest distance.

FIG. 3 is a lens cross-sectional view of an optical system according to Example 2 of the present invention. FIG. 4A and FIG. 4B are aberration diagrams of the optical system of Example 2 when focused at infinity and when focused at the closest distance, respectively. The term "the closest distance" in this example is when an image pickup magnification is −0.19. Example 2 relates to an optical system having an F-number of 1.25 and an image pickup angle of view of 45.90°.

Figure 5:
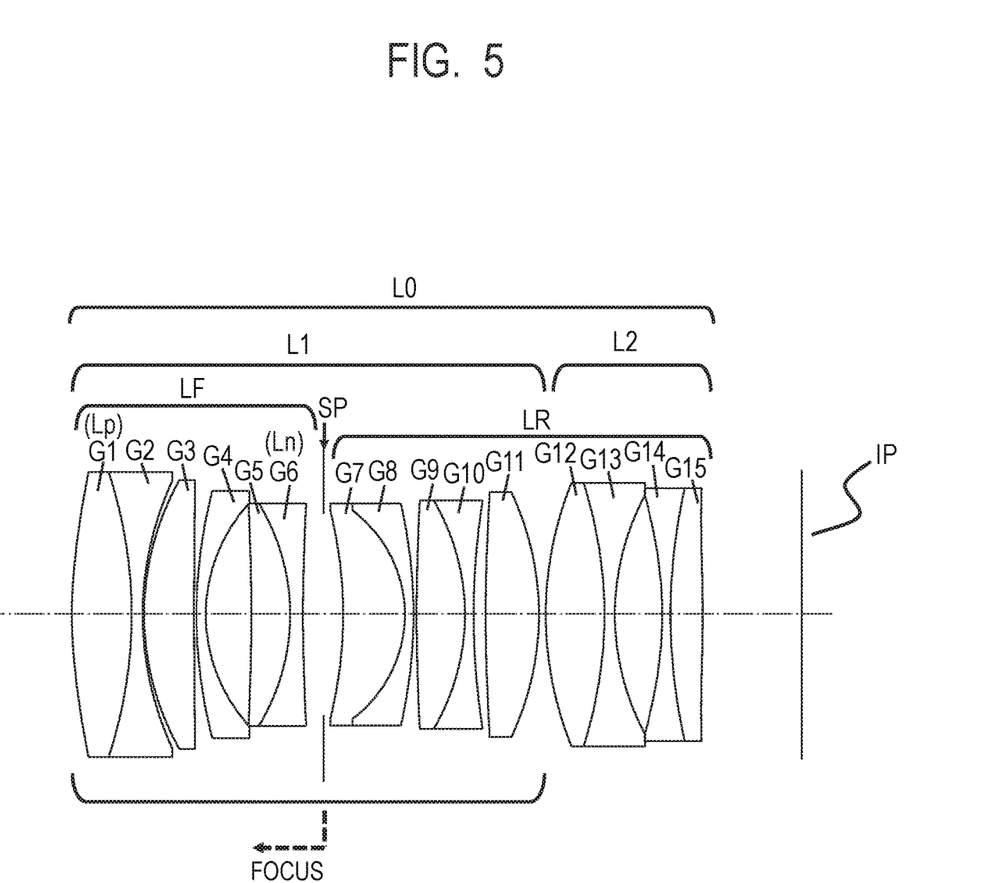
FIG. 5 is a lens cross-sectional view of an optical system according to Example 3 of the present invention.
Figure 6A:
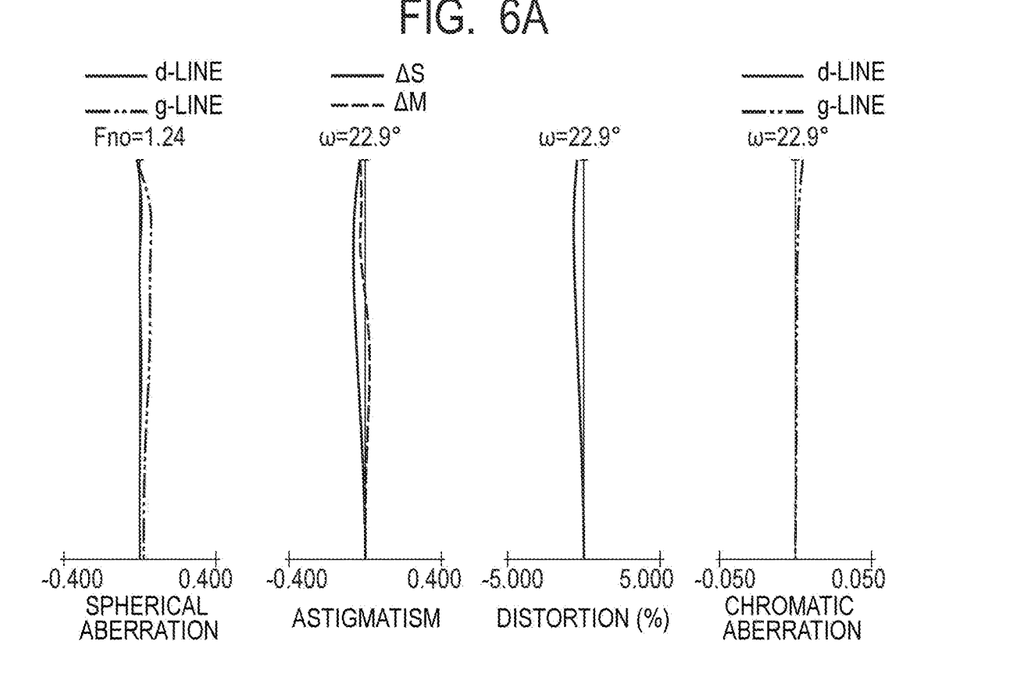
FIG. 6A is an aberration diagram of the optical system of Example 3 when focused at infinity.
Figure 6B:
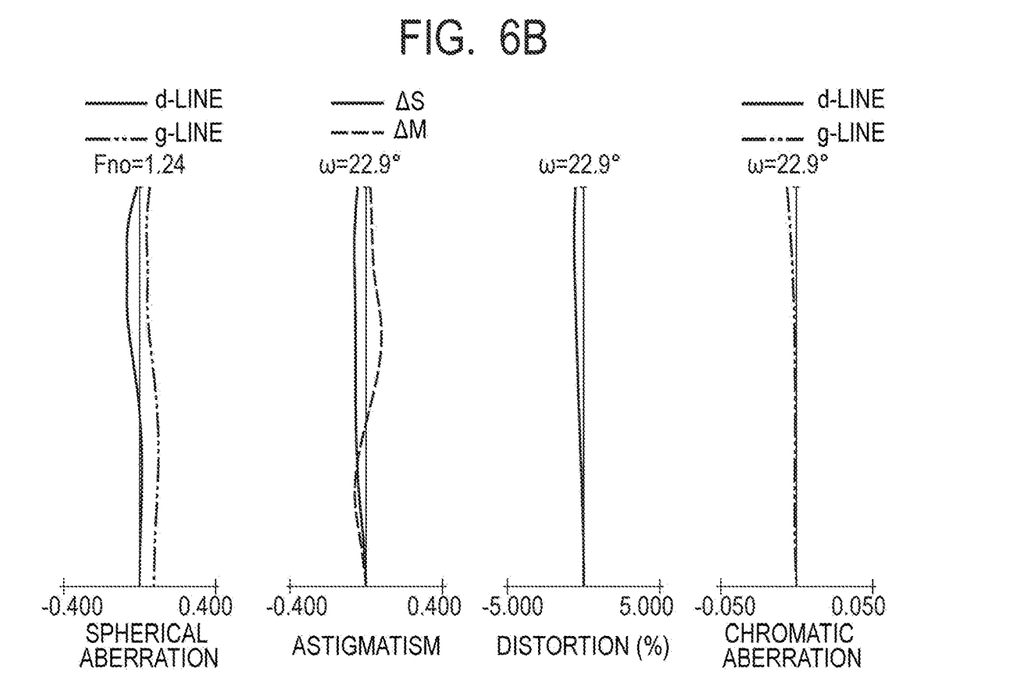
FIG. 6B is an aberration diagram of the optical system of Example 3 when focused at the closest distance.

FIG. 5 is a lens cross-sectional view of an optical system according to Example 3 of the present invention. FIG. 6A and FIG. 6B are aberration diagrams of the optical system of Example 3 when focused at infinity and when focused at the closest distance, respectively. The term "the closest distance" in this example is when an image pickup magnification is −0.16. Example 3 relates to an optical system having an F-number of 1.24 and an image pickup angle of view of 45.84°.

Figure 7:
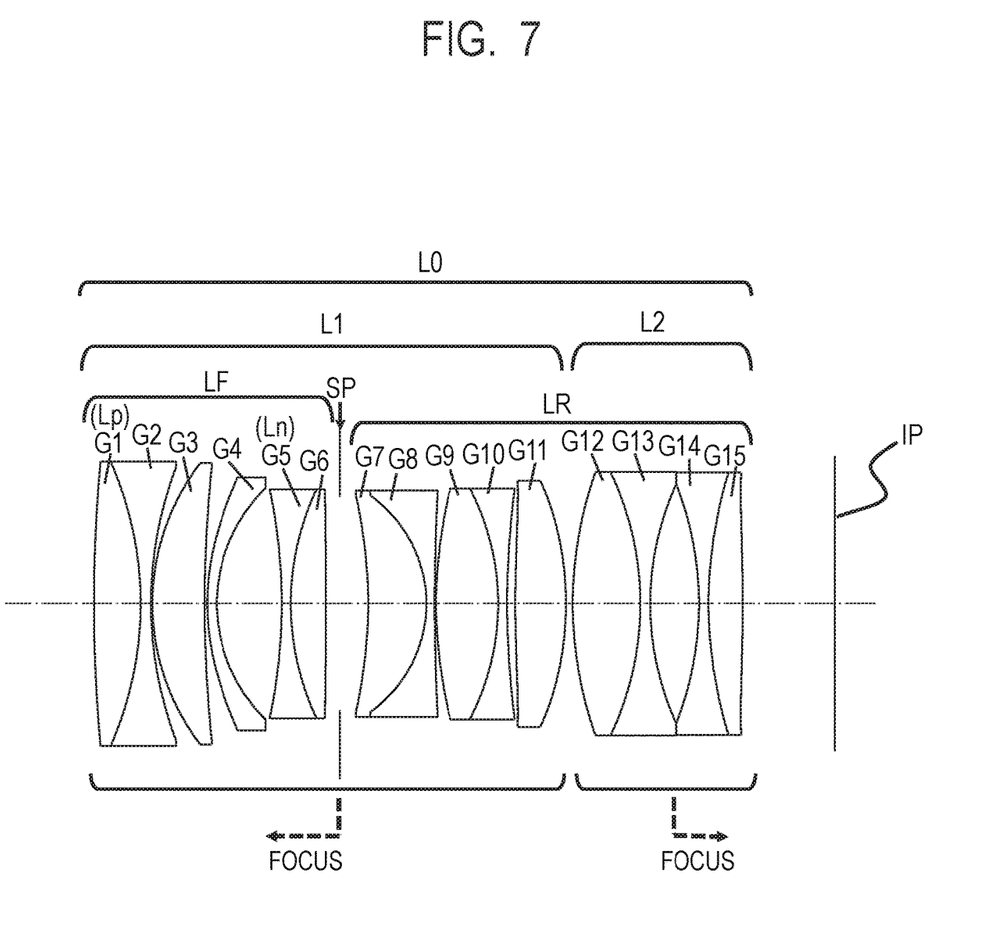
FIG. 7 is a lens cross-sectional view of an optical system according to Example 4 of the present invention.
Figure 8A:
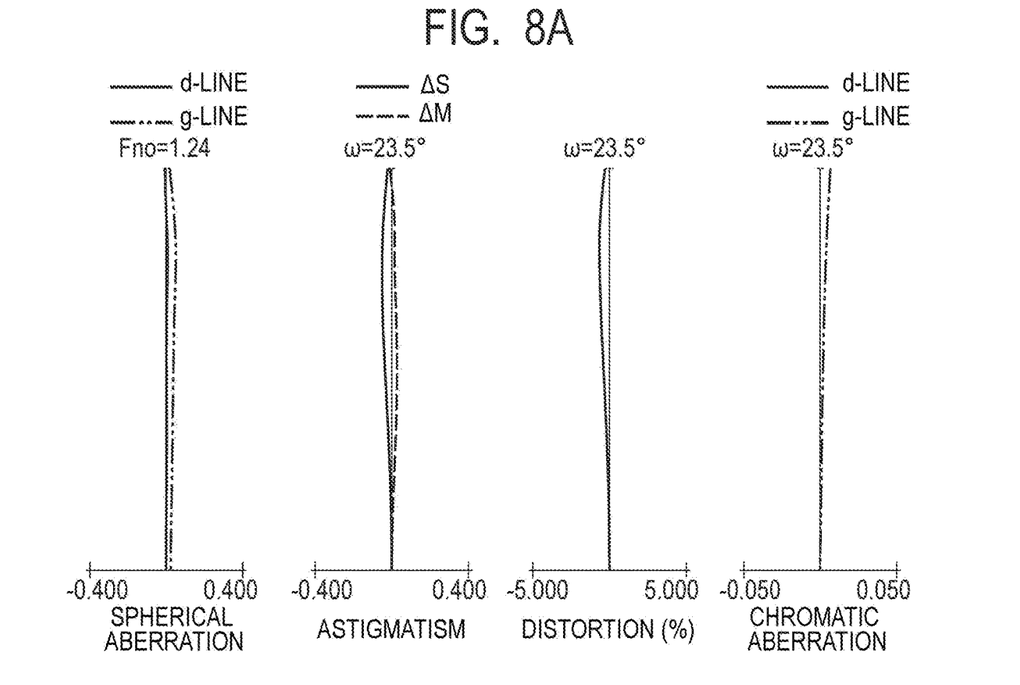
FIG. 8A is an aberration diagram of the optical system of Example 4 when focused at infinity.
Figure 8B:
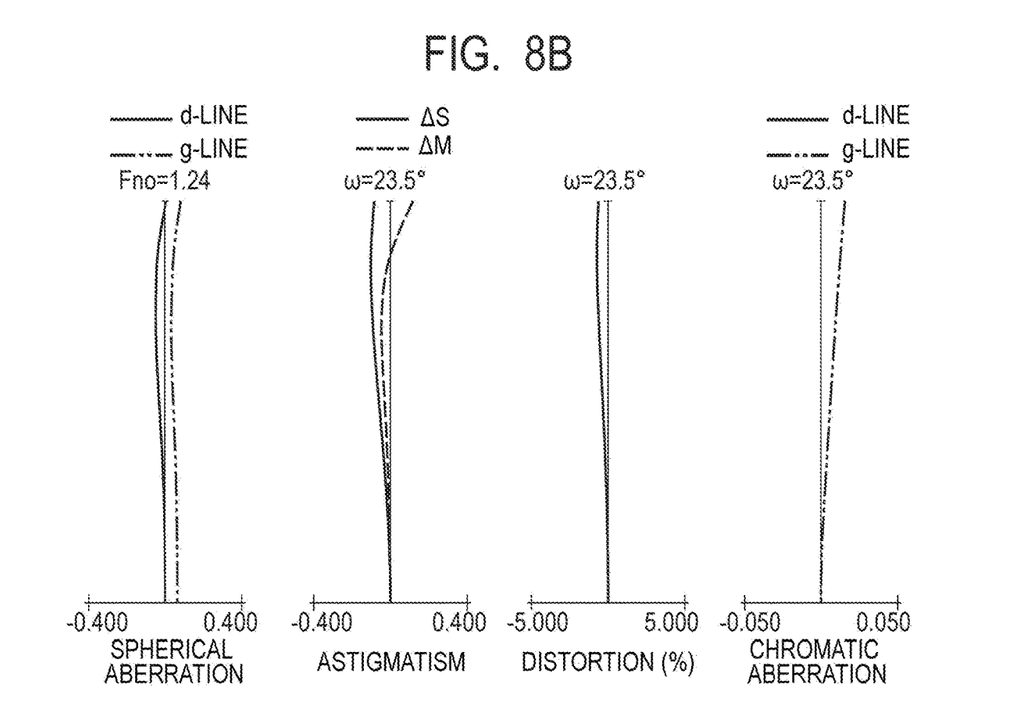
FIG. 8B is an aberration diagram of the optical system of Example 4 when focused at the closest distance.
Figure 9:
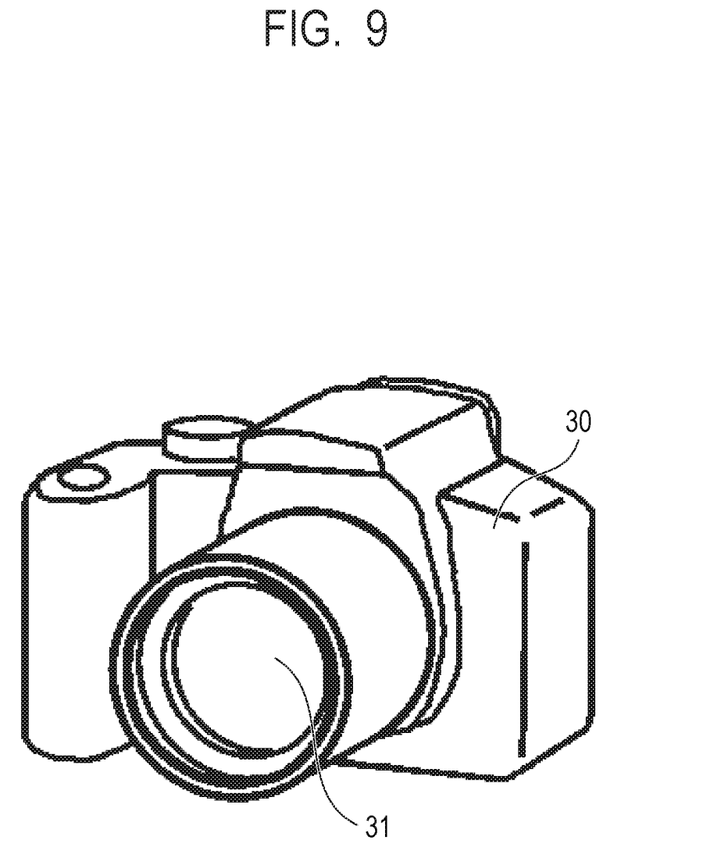
FIG. 9 is a schematic view of a main part of an image pickup apparatus according to an embodiment of the present invention.

FIG. 7 is a lens cross-sectional view of an optical system according to Example 4 of the present invention. FIG. 8A and FIG. 8B are aberration diagrams of the optical system of Example 4 when focused at infinity and when focused at the closest distance, respectively. The term "the closest distance" in this example is when an image pickup magnification is −0.15. Example 4 relates to an optical system having an F-number of 1.24 and an image pickup angle of view of 47.08°. FIG. 9 is a schematic view of a main part of the image pickup apparatus according to an embodiment of the present invention.

The optical systems in Examples are image pickup optical systems used with image pickup apparatus, such as a video camera, a digital camera, a TV camera, and a monitoring camera. In the lens cross-sectional views, the left side is the object side (front side), and the right side is the image side (rear side). In the lens cross-sectional views, an optical system is represented by L0. The order of a lens unit from the object side is represented by "i", and the i-th lens unit is represented by Li. An aperture stop is represented by SP. In the lens cross-sectional views, a front lens group LF is arranged on the object side of the aperture stop SP. A rear lens group LR is arranged on the image side of the aperture stop SP.

The optical system according to each of Example 1 to Example 3 consists of, in order from the object side to the image side, a front lens group LF having a positive refractive power, an aperture stop SP, and a rear lens group LR having a positive refractive power. A first lens unit L1 having a positive refractive power is configured to move during focusing, and a second lens unit L2 having a positive refractive power is configured not to move during focusing.

In each of Examples 1 to 3, focusing from infinity to a close distance is performed by moving the first lens unit L1 toward the object side as indicated by the dotted arrow regarding focus. The first lens unit L1 consists of the front lens group LF and lenses forming a part of the rear lens group LR. The second lens unit L2 consists of lenses forming another part of the rear lens group LR.

The optical system according to Example 4 consists of, in order from the object side to the image side, a front lens group LF having a positive refractive power, an aperture stop SP, and a rear lens group LR having a positive refractive power. A first lens unit L1 having a positive refractive power is configured to move during focusing, and a second lens unit L2 having a positive refractive power is configured to move during focusing. In Example 4, focusing is performed by moving the first lens unit L1 and the second lens unit L2 independently (along different loci) in an optical axis direction. Specifically, focusing from infinity to the close distance is performed by moving the first lens unit L1 toward the object side and moving the second lens unit L2 toward the image side as indicated by the dotted arrows regarding focus.

The first lens unit L1 consists of the front lens group LF and lenses forming a part of the rear lens group LR. The second lens unit L2 consists of lenses forming another part of the rear lens group LR.

In the lens cross-sectional views, at an image plane IP, an image pickup element (photoelectric conversion element), such as a CCD sensor, a CMOS sensor or the like, is placed when the optical system is used as a photographing optical system for a video camera or a digital still camera. In aberration diagrams of spherical aberration and lateral chromatic aberration, a solid line "d" indicates a d-line (wavelength: 587.6 nm), and a two-dot chain line "g" indicates a g-line (wavelength: 435.8 nm). In the astigmatism diagrams, a dotted line ΔM indicates a meridional image plane of the d-line, and a solid line ΔS indicates a sagittal image plane of the d-line. Moreover, distortion is indicated by the d-line. A half angle of view (value that is half an image pickup angle of view) is represented by ω (degrees (°)), and an F-number is represented by Fno.

In each of Examples, the optical system consists of, in order from the object side to the image side, the front lens group LF having the positive refractive power, the aperture stop SP, and the rear lens group LR. The front lens group LF includes at least one positive lens and at least one negative lens. A positive lens Lp is arranged closest to the object side among the at least one positive lens. Preferably, the positive lens Lp is arranged closest the object side in the front lens group LF. Of the at least one negative lens included in the front lens group LF, a negative lens arranged closest to the image side is represented as a "negative lens Ln".

A focal length of the positive lens Lp is represented by fLp, a focal length of the negative lens Ln is represented by fLn, a distance on an optical axis from a lens surface on the object side of the positive lens Lp to the aperture stop SP is represented by Dps, and a distance on the optical axis from a lens surface on the object side of the negative lens Ln to the aperture stop SP is represented by Dns. A distance on the optical axis from the aperture stop SP to a lens surface closest to the image side in the rear lens group LR when the optical system is focused at infinity is represented by Dsr. At this time, the following conditional expressions are satisfied in the optical system.

$$1.0 < fLp/Dps < 2.0 \tag{1}$$

$$0.35 < Dps/Dsr < 0.85 \tag{2}$$

$$-10.0 < fLn/Dns < -3.0 \tag{3}$$

Next, technical meanings of the above-mentioned conditional expressions are described. In the conditional expression (1), in order to satisfactorily achieve reductions in effective diameters of lenses arranged on the image side of the positive lens Lp and in outer diameter of the aperture stop SP, and perform correction of spherical aberration, the focal length of the positive lens Lp and the distance from the lens surface on the object side of the positive lens Lp to the aperture stop SP are appropriately set.

When the ratio exceeds the upper limit value of the conditional expression (1), and the focal length of the positive lens Lp becomes longer, convergence of an axial light flux becomes insufficient, and it becomes difficult to reduce the effective diameters of the lenses arranged on the image side of the positive lens Lp and the outer diameter of the aperture stop SP. When the ratio falls below the lower limit value of the conditional expression (1), and the focal length of the positive lens Lp becomes shorter, curvature radii of the lens surfaces of the positive lens Lp become much smaller, and hence large amounts of various aberrations, such as spherical aberration, are generated by the front lens group LF, with the result that it becomes difficult to correct various aberrations.

In the conditional expression (2), in order to reduce an effective lens diameter of the positive lens Lp and the outer diameter of the aperture stop SP, the distance from the lens surface on the object side of the positive lens Lp to the aperture stop SP, and the distance from the aperture stop SP to the lens surface closest to the image side in the rear lens group LR are appropriately set.

When the ratio exceeds the upper limit value of the conditional expression (2), and the distance from the lens surface on the object side of the positive lens Lp to the aperture stop SP becomes longer, the effective lens diameter of the positive lens Lp is disadvantageously increased in order to secure a sufficient amount of an off-axial light flux. When the ratio falls below the lower limit value of the conditional expression (2), and the distance from the lens surface on the object side of the positive lens Lp to the aperture stop SP becomes shorter, convergence of the axial light flux becomes insufficient, and it becomes difficult to reduce the outer diameter of the aperture stop SP.

In the conditional expression (3), in order to satisfactorily correct spherical aberration generated in the front lens group LF while reducing an effective lens diameter of the negative lens Ln, the focal length of the negative lens Ln, and the distance from the lens surface on the object side of the negative lens Ln to the aperture stop SP are appropriately set. When the ratio exceeds the upper limit value of the conditional expression (3), and the distance from the lens surface on the object side of the negative lens Ln to the aperture stop SP becomes longer, it becomes difficult to reduce the effective lens diameter of the negative lens Ln. When the ratio falls below the lower limit value of the conditional expression (3), and the focal length of the negative lens Ln becomes longer, the effect of correcting spherical aberration by the negative lens Ln becomes smaller, and hence it becomes difficult to satisfactorily correct spherical aberration.

It is preferred to set the numerical ranges of the conditional expressions (1), (2), and (3) as follows.

$$1.1 < fLp/Dps < 1.7 \tag{1a}$$

$$0.45 < Dps/Dsr < 0.75 \tag{2a}$$

$$-9.0 < fLn/Dns < -3.5 \tag{3a}$$

It is more preferred to set the numerical ranges of the conditional expressions (1a), (2a), and (3a) as follows.

$$1.2 < fLp/Dps < 1.5 \tag{1b}$$

$$0.55 < Dps/Dsr < 0.70 \tag{2b}$$

$$-8.0 < fLn/Dns < -4.0 \tag{3b}$$

With the above-mentioned configuration, there can be obtained the optical system with which, even with the large aperture ratio, spherical aberration and other various aberrations are satisfactorily corrected, and high optical performance is obtained while downsizing of the entire lens system is achieved.

In each of Examples, it is more preferred to satisfy one or more of conditional expressions provided below. An average value of refractive indices with respect to the d-line of materials of all positive lenses included in the front lens group LF is represented by Npave. An average value of refractive indices with respect to the d-line of materials of all negative lenses included in the front lens group LF is represented by Nnave. A focal length of the front lens group LF is represented by "f". A focal length of the rear lens group LR is represented by "fr".

The optical system L0 consists of, in order from the object side to the image side, a first lens unit L1 having a positive refractive power, and a second lens unit L2 having a positive refractive power. A focal length of the first lens unit L1 is represented by f1, and a focal length of the second lens unit L2 is represented by f2.

At this time, it is preferred to satisfy one or more of the following conditional expressions.

$$1.85 < Np\text{ave} < 2.00 \tag{4}$$

$$1.60 < Nn\text{ave} < 1.75 \tag{5}$$

$$0.1 < Lp/ff < 0.5 \tag{6}$$

$$-1.8 < fLp/fLn < -0.8 \tag{7}$$

$$0.1 < fr/ff < 0.5 \tag{8}$$

$$0.01 < f1/f2 < 0.30 \tag{9}$$

Next, technical meanings of the above-mentioned conditional expressions are described. In the conditional expression (4), in order to satisfactorily correct spherical aberration, astigmatism, and other various aberrations generated in the front lens group LF, the average value of the refractive indices with respect to the d-line of the materials of all the positive lenses included in the front lens group LF is appropriately set.

When the value exceeds the upper limit value of the conditional expression (4), and the average value of the refractive indices with respect to the d-line of the materials of the positive lenses included in the front lens group LF becomes larger, spherical aberration, astigmatism, or the like can be satisfactorily corrected, but high dispersion glass materials are heavily used, with the result that it becomes difficult to correct axial chromatic aberration and lateral chromatic aberration. When the value falls below the lower limit value of the conditional expression (4), and the average value of the refractive indices with respect to the d-line of the materials of the positive lenses included in the front lens group LF becomes smaller, curvature radii of lens surfaces of the positive lenses become smaller, and it becomes difficult to satisfactorily correct various aberrations, such as spherical aberration, astigmatism.

In the conditional expression (5), in order to satisfactorily correct spherical aberration, astigmatism, and other various aberrations generated in the front lens group LF, the average value of the refractive indices with respect to the d-line of the materials of the negative lenses included in the front lens group LF is appropriately set. When the value exceeds the upper limit value of the conditional expression (5), and the average value of the refractive indices with respect to the d-line of the materials of the negative lenses included in the front lens group LF becomes larger, it becomes difficult to correct astigmatism. When the value falls below the lower limit value of the conditional expression (5), and the average value of the refractive indices with respect to the d-line of the materials of the negative lenses included in the front lens group LF becomes smaller, curvature radii of lens surfaces of the negative lenses become smaller, and it becomes difficult to correct various aberrations, such as spherical aberration.

In the conditional expression (6), in order to satisfactorily correct spherical aberration while reducing the effective diameters of the lenses arranged on the image side of the positive lens Lp and the outer diameter of the aperture stop SP, a ratio of the focal length of the positive lens Lp to the focal length of the front lens group LF is appropriately set.

When the ratio exceeds the upper limit value of the conditional expression (6), and the focal length of the positive lens Lp becomes longer with respect to the focal length of the front lens group LF, convergence of the axial light flux becomes insufficient, and it becomes difficult to reduce the effective diameters of the lenses arranged on the image side of the positive lens Lp and the outer diameter of the aperture stop SP. When the ratio falls below the lower limit value of the conditional expression (6), and the focal length of the positive lens Lp becomes shorter with respect to the focal length of the front lens group LF, the curvature radii of the lens surfaces of the positive lens Lp become much smaller, and hence large amounts of various aberrations, such as spherical aberration, are generated by the front lens group LF, with the result that it becomes difficult to correct those various aberrations.

In the conditional expression (7), in order to satisfactorily correct spherical aberration in the front lens group LF, a ratio of the focal length of the positive lens Lp to the focal length of the negative lens Ln is appropriately set. When the ratio exceeds the upper limit value of the conditional expression (7), and the focal length of the positive lens Lp becomes shorter, or the focal length of the negative lens Ln becomes longer (absolute value of the negative focal length becomes larger), it becomes difficult to sufficiently correct spherical aberration generated on the object side of the negative lens Ln.

When the ratio falls below the lower limit value of the conditional expression (7), and the focal length of the positive lens Lp becomes longer, or the focal length of the negative lens Ln becomes shorter (absolute value of the negative focal length becomes smaller), spherical aberration is overcorrected by the negative lens Ln. Therefore, it becomes difficult to satisfactorily correct spherical aberration by the front lens group LF.

In the conditional expression (8), in order to satisfactorily correct spherical aberration and other various aberrations, a ratio of the focal length of the front lens group LF to the focal length of the rear lens group LR is appropriately set. When the ratio exceeds the upper limit value of the conditional expression (8), and the focal length of the front lens group LF becomes shorter, or the focal length of the rear lens group LR becomes longer, it becomes difficult to satisfactorily correct spherical aberration by the front lens group LF. When the ratio falls below the lower limit value of the conditional expression (8), and the focal length of the front lens group LF becomes longer, or the focal length of the rear lens group LR becomes shorter, it becomes difficult to reduce spherical aberration by the rear lens group LR.

In the conditional expression (9), in order to reduce variations in various aberrations, such as spherical aberration, which are caused by focusing, while downsizing the entire optical system, a ratio of the focal length of the first lens unit L1 to the focal length of the second lens unit L2 is appropriately set.

When the ratio exceeds the upper limit value of the conditional expression (9), and the focal length of the first lens unit L1 becomes longer, an extension amount of the first lens unit L1 during focusing at a close distance becomes much larger, and hence it becomes difficult to downsize the entire optical system. When the ratio falls below the lower limit value of the conditional expression (9), and the focal length of the first lens unit L1 becomes shorter, variations in spherical aberration and other various aberrations become much larger during focusing. Therefore, it becomes difficult to obtain high optical performance over the entire object distance from infinity to the close distance.

In each of Examples, it is preferred to set the numerical ranges of the conditional expressions (4) to (9) as follows.

$$1.88 < Npave < 1.97 \tag{4a}$$

$$1.63 < Nnave < 1.72 \tag{5a}$$

$$0.15 < fLp/ff < 0.47 \tag{6a}$$

$$-1.70 < fLp/fLn < -0.88 \tag{7a}$$

$$0.15 < fr/ff < 0.45 \tag{8a}$$

$$0.03 < f1/f2 < 0.18 \tag{9a}$$

Moreover, further preferably, when the numerical ranges of the conditional expression (4a) to the conditional expression (9a) are set as follows, the above-mentioned effects meant by the conditional expressions can be obtained to the greatest extent.

$$1.90 < Npave < 1.95 \tag{4b}$$

$$1.65 < Nnave < 1.70 \tag{5b}$$

$$0.20 < fLp/ff < 0.45 \tag{6b}$$

$$-1.50 < fLp/fLn < -0.95 \tag{7b}$$

$$0.20 < fr/ff < 0.42 \tag{8b}$$

$$0.05 < f1/f2 < 0.12 \tag{9b}$$

In each of Examples, with the elements being configured as described above, there can be achieved the optical system with which, even with the large aperture ratio, spherical aberration and other various aberrations are satisfactorily corrected, and high optical performance is obtained while downsizing of the entire lens system is achieved.

The optical system according to each of Examples consists of, in order from the object side to the image side, the front lens group LF having the positive refractive power, the aperture stop SP, and the rear lens group LR having the positive refractive power. With such configuration, satisfactory correction of aberrations is facilitated while the outer diameter of the aperture stop SP is reduced even when the large aperture ratio is achieved. Focusing from infinity to a close distance is performed by moving the first lens unit L1 toward the object side.

Through adoption of a front focus system in which the first lens unit L1 is moved, variations in spherical aberration and other various aberrations, which are generated during focusing, are satisfactorily reduced while reductions in lens outer diameters, in particular, the reduction in effective diameter of the front lens is achieved. It is preferred that the front lens group LF include, in order from the object side to the image side, a first lens having a positive refractive power, a second lens having a negative refractive power, a third lens having a positive refractive power, and a fourth lens having a negative refractive power.

Specifically, in each of Examples 1, 2, and 4, the front lens group LF consists of, in order from the object side to the image side, the following six lenses: a cemented lens obtained by cementing a positive lens G1 (Lp) and a negative lens G2, a positive lens G3, a negative lens G4, and a cemented lens obtained by cementing a negative lens G5 (Ln) and a positive lens G6.

In Example 3, the front lens group LF consists of, in order from the object side to the image side, the following six lenses: a cemented lens obtained by cementing a positive lens G1 (Lp) and a negative lens G2, a positive lens G3, a negative lens G4, and a cemented lens obtained by cementing a positive lens G5 and a negative lens G6 (Ln). With the front lens group LF being configured as described above, even with the large aperture ratio, various aberrations, such as spherical aberration and astigmatism, are satisfactorily corrected while reducing the lens outer diameters and the outer diameter of the aperture stop SP.

The rear lens group LR consists of, in order from the object side to the image side, the following nine lenses: a cemented lens obtained by cementing a positive lens G7 and a negative lens G8, a cemented lens obtained by cementing a positive lens G9 and a negative lens G10, a positive lens G11, a cemented lens obtained by cementing a positive lens G12 and a negative lens G13, and a cemented lens obtained by cementing a negative lens G14 and a positive lens G15. With the rear lens group LR being configured as described above, various aberrations, such as axial chromatic aberration, lateral chromatic aberration, spherical aberration, and astigmatism, are satisfactorily corrected.

According to each of Examples, with the above-mentioned configuration, there can be obtained the optical system with which, even with the large aperture ratio, spherical aberration and other various aberrations are satisfactorily corrected, and high optical performance can be obtained while downsizing of the entire lens system is achieved.

Next, an image pickup apparatus (digital camera) according to an embodiment of the present invention, which uses the optical system according to any one of Examples of the present invention, is described with reference to FIG. 9. In FIG. 9, the image pickup apparatus includes a camera main body 30, and an optical system 31 described in any one of Examples 1 to 4. An image pickup element (photoelectric conversion element), such as CCD sensor, a CMOS sensor or the like, which is configured to receive light of an object image formed by the optical system 31, is included in the camera main body 30.

Specific numerical data of Examples 1 to 4 is provided below. In each set of numerical data, the order counted from the object side is represented by "i". A curvature radius of the i-th surface from the object side is represented by "ri", a surface interval between the i-th surface and the (i+1)-th surface from the object side is represented by "di", a refractive index with respect to the d-line of a material of a lens between the i-th surface and the (i+1)-th surface from the object side is represented by "ni", and an Abbe number with respect to the d-line of a material of the lens between the i-th surface and the (i+1)-th surface from the object side is represented by "vi". An aspherical shape, which is represented by "x", is a displacement in the optical axis direction with reference to a surface vertex at the position of a height "h" from the optical axis when a conic constant is represented by K, and the 4th, 6th, 8th, 10th, and 12th-order aspherical coefficients are represented by A4, A6, A8, A10, and A12, respectively.

At this time, the aspherical shape is expressed as follows.

$$x=(h^2/R)/[1+[1-(1+K)(h/R)^2]^{1/2}]+A4h^4+A6h^6+A8h^8+A10h^{10}+A12h^{12}$$

In the expression, R represents a paraxial curvature radius, and "e-X" means "$\times 10^{-X}$". An asterisk (*) is affixed to the right of the surface number of each aspherical surface in each table. In the numerical data, a back focus (BF) is an air-equivalent distance from the last lens surface to a paraxial image plane when the optical system is focused at infinity. The total lens length is a value obtained by adding the back focus to a distance from a lens surface closest to the object side to a lens surface closest to the image side when the optical system is focused at infinity. Moreover, correspondence of each set of numerical data to the above-mentioned conditional expressions is shown in Table 1.

[Numerical Data 1]

| Unit: mm | | | | |
|---|---|---|---|---|
| Surface data | | | | |
| Surface number | r | d | nd | vd |
| 1* | 82.909 | 8.39 | 1.76802 | 49.2 |
| 2 | −68.211 | 1.50 | 1.73800 | 32.3 |
| 3 | 77.682 | 0.20 | | |
| 4 | 40.481 | 6.87 | 1.95375 | 32.3 |
| 5 | 855.015 | 0.20 | | |
| 6 | 74.822 | 1.40 | 1.65412 | 39.7 |
| 7 | 25.210 | 6.56 | | |
| 8 | −1,195.622 | 1.20 | 1.66565 | 35.6 |
| 9 | 31.561 | 4.14 | 2.00100 | 29.1 |
| 10 | 75.602 | 3.47 | | |
| 11 (Stop) | ∞ | 3.09 | | |
| 12 | −92.693 | 7.53 | 1.43875 | 94.7 |
| 13 | −21.093 | 1.20 | 1.72047 | 34.7 |
| 14 | 349.334 | 0.20 | | |
| 15 | 55.420 | 10.37 | 1.76385 | 48.5 |
| 16 | −29.287 | 1.30 | 1.66565 | 35.6 |
| 17 | 55.742 | 0.71 | | |
| 18* | 65.419 | 8.32 | 1.85400 | 40.4 |
| 19* | −49.838 | (Variable) | | |
| 20 | 52.651 | 10.03 | 1.88300 | 40.8 |
| 21 | −47.216 | 1.50 | 1.66565 | 35.6 |
| 22 | 41.182 | 7.53 | | |
| 23 | −48.251 | 1.40 | 1.61340 | 44.3 |
| 24 | 151.332 | 3.90 | 1.85400 | 40.4 |
| 25* | −163.746 | 14.00 | | |
| Image plane | ∞ | | | |

| Aspherical surface data |
|---|
| First surface |

K = 0.00000e+000    A4 = −1.39341e−006    A6 = −4.81896e−010
A8 = 7.22917e−014    A10 = 2.22678e−017

Eighteenth surface

K = 0.00000e+000    A4 = −2.25923e−006    A6 = 8.73754e−010
A8 = −3.92386e−012    A10 = −8.48899e−018

-continued

Unit: mm

Nineteenth surface

K = 0.00000e+000   A4 = 1.43503e−006   A6 = 8.01071e−010
A8 = −1.43275e−012

Twenty-fifth surface

K = 0.00000e+000   A4 = 2.90301e−006   A6 = 2.73324e−010
A8 = 1.09277e−011   A10 = −1.31337e−014   A12 = 5.68359e−018

Various data

| | |
|---|---|
| Focal length | 51.50 |
| F-number | 1.24 |
| Half angle of view (degrees) | 22.79 |
| Image height | 21.64 |
| Total lens length | 106.00 |
| BF | 14.00 |

| | Infinity | Closest distance |
|---|---|---|
| d19 | 1.00 | 13.22 |

Lens group data

| Group | First surface | Focal length |
|---|---|---|
| LF | 1 | 172.21 |
| LR | 12 | 45.97 |

Lens unit data

| Unit | First surface | Focal length |
|---|---|---|
| L1 | 1 | 62.11 |
| L2 | 20 | 614.51 |

Single lens data

| Lens | First surface | Focal length |
|---|---|---|
| 1 | 1 | 49.93 |
| 2 | 2 | −49.00 |
| 3 | 4 | 44.37 |
| 4 | 6 | −58.78 |
| 5 | 8 | −46.18 |
| 6 | 9 | 51.70 |
| 7 | 12 | 60.31 |
| 8 | 13 | −27.57 |
| 9 | 15 | 26.49 |
| 10 | 16 | −28.67 |
| 11 | 18 | 34.26 |
| 12 | 20 | 29.58 |
| 13 | 21 | −32.82 |
| 14 | 23 | −59.49 |
| 15 | 24 | 92.62 |

[Numerical Data 2]

Unit: mm

Surface data

| Surface number | r | d | nd | vd |
|---|---|---|---|---|
| 1* | 80.110 | 9.67 | 1.80400 | 46.58 |
| 2 | −68.243 | 1.64 | 1.68893 | 31.07 |
| 3 | 52.862 | 0.20 | | |
| 4 | 42.184 | 7.47 | 2.00100 | 29.13 |
| 5 | 2,510.576 | 0.70 | | |
| 6 | 99.979 | 1.60 | 1.65412 | 39.68 |
| 7 | 24.508 | 7.45 | | |
| 8 | −101.919 | 1.34 | 1.66565 | 35.64 |
| 9 | 34.799 | 5.56 | 1.95375 | 32.32 |
| 10 | 516.053 | 2.44 | | |
| 11 (Stop) | ∞ | 2.58 | | |
| 12 | −1,398.232 | 10.02 | 1.49700 | 81.54 |
| 13 | −20.985 | 1.29 | 1.73800 | 32.26 |
| 14 | 251.143 | 0.44 | | |
| 15 | 87.566 | 7.29 | 1.76385 | 48.51 |
| 16 | −43.447 | 1.28 | 1.66565 | 35.64 |
| 17 | 105.692 | 1.79 | | |
| 18* | 161.695 | 7.96 | 1.88300 | 40.80 |
| 19 | −42.423 | (Variable) | | |
| 20 | 54.474 | 8.77 | 1.88300 | 40.80 |
| 21 | −60.531 | 1.54 | 1.59551 | 39.24 |
| 22 | 40.560 | 7.14 | | |
| 23 | −58.170 | 1.21 | 1.67300 | 38.15 |
| 24 | 105.985 | 5.08 | 1.80400 | 46.58 |
| 25* | −216.191 | 14.60 | | |
| Image plane | ∞ | | | |

Aspherical surface data

First surface

K = 0.00000e+000   A4 = −1.44652e−006   A6 = −1.02693e−009
A8 = 1.91678e−012   A10 = −3.07794e−015   A12 = 2.00476e−018

Eighteenth surface

K = 0.00000e+000   A4 = −2.17027e−006   A6 = 4.00496e−009
A8 = −1.90948e−011   A10 = 4.86536e−014   A12 = −4.89586e−017

Twenty-fifth surface

K = 0.00000e+000   A4 = 3.50064e−006   A6 = −5.98670e−010
A8 = 1.34319e−011   A10 = −2.56798e−014   A12 = 2.59930e−017

Various data

| | |
|---|---|
| Focal length | 51.10 |
| F-number | 1.25 |
| Half angle of view (degrees) | 22.95 |
| Image height | 21.64 |
| Total lens length | 111.01 |
| BF | 14.60 |

| | Infinity | Closest distance |
|---|---|---|
| d19 | 1.95 | 16.11 |

Lens group data

| Group | First surface | Focal length |
|---|---|---|
| LF | 1 | 198.77 |
| LR | 12 | 44.87 |

Lens unit data

| Unit | First surface | Focal length |
|---|---|---|
| L1 | 1 | 61.31 |
| L2 | 20 | 586.40 |

Single lens data

| Lens | First surface | Focal length |
|---|---|---|
| 1 | 1 | 47.21 |
| 2 | 2 | −43.00 |
| 3 | 4 | 42.80 |
| 4 | 6 | −50.05 |
| 5 | 8 | −38.82 |
| 6 | 9 | 38.91 |
| 7 | 12 | 42.76 |
| 8 | 13 | −26.19 |
| 9 | 15 | 38.96 |
| 10 | 16 | −46.10 |
| 11 | 18 | 38.77 |
| 12 | 20 | 33.67 |
| 13 | 21 | −40.55 |

-continued

Unit: mm

| | | |
|---|---|---|
| 14 | 23 | −55.64 |
| 15 | 24 | 89.08 |

[Numerical Data 3]

Unit: mm

Surface data

| Surface number | r | d | nd | vd |
|---|---|---|---|---|
| 1* | 78.899 | 8.90 | 1.80400 | 46.6 |
| 2 | −67.718 | 1.64 | 1.68893 | 31.1 |
| 3 | 47.472 | 0.20 | | |
| 4 | 40.920 | 7.47 | 2.00100 | 29.1 |
| 5 | 1,429.704 | 0.40 | | |
| 6 | 72.656 | 1.40 | 1.61340 | 44.3 |
| 7 | 24.711 | 6.80 | | |
| 8 | −324.647 | 5.80 | 1.91082 | 35.3 |
| 9 | −31.915 | 1.90 | 1.73800 | 32.3 |
| 10 | 298.008 | 3.10 | | |
| 11 (Stop) | ∞ | 2.90 | | |
| 12 | −63.639 | 9.20 | 1.49700 | 81.5 |
| 13 | −19.466 | 1.29 | 1.73800 | 32.3 |
| 14 | −73.147 | 0.44 | | |
| 15 | 307.461 | 7.29 | 1.76385 | 48.5 |
| 16 | −33.624 | 1.28 | 1.66565 | 35.6 |
| 17 | 109.612 | 1.79 | | |
| 18* | 244.351 | 7.96 | 1.88300 | 40.8 |
| 19 | −42.656 | (Variable) | | |
| 20 | 52.456 | 8.77 | 1.88300 | 40.8 |
| 21 | −63.325 | 1.54 | 1.59551 | 39.2 |
| 22 | 37.881 | 7.14 | | |
| 23 | −60.219 | 1.21 | 1.67300 | 38.1 |
| 24 | 84.630 | 4.80 | 1.80400 | 46.6 |
| 25* | −271.123 | 14.78 | | |
| Image plane | ∞ | | | |

Aspherical surface data

First surface

K = 0.00000e+000   A4 = −1.87321e−006   A6 = −2.04579e−009
A8 = 5.76182e−012   A10 = −1.07978e−014   A12 = 8.19265e−018

Eighteenth surface

K = 0.00000e+000   A4 = −1.48368e−006   A6 = 1.04147e−008
A8 = −6.04874e−011   A10 = 1.74410e−013   A12 = −1.93793e−016

Twenty-fifth surface

K = 0.00000e+000   A4 = 2.13700e−006   A6 = 1.42005e−008
A8 = −5.68578e−011   A10 = 1.36417e−013   A12 = −1.25415e−016

Various data

| | |
|---|---|
| Focal length | 51.18 |
| F-number | 1.24 |
| Half angle of view (degrees) | 22.92 |
| Image height | 21.64 |
| Total lens length | 109.00 |
| BF | 14.78 |

| | Infinity | Closest distance |
|---|---|---|
| d19 | 1.00 | 12.61 |

Lens group data

| Group | First surface | Focal length |
|---|---|---|
| LF | 1 | 137.35 |
| LR | 12 | 48.25 |

-continued

Unit: mm

Lens unit data

| Unit | First surface | Focal length |
|---|---|---|
| L1 | 1 | 60.90 |
| L2 | 20 | 841.47 |

Single lens data

| Lens | First surface | Focal length |
|---|---|---|
| 1 | 1 | 46.59 |
| 2 | 2 | −40.28 |
| 3 | 4 | 41.97 |
| 4 | 6 | −61.73 |
| 5 | 8 | 38.50 |
| 6 | 9 | −38.97 |
| 7 | 12 | 52.78 |
| 8 | 13 | −36.31 |
| 9 | 15 | 40.05 |
| 10 | 16 | −38.52 |
| 11 | 18 | 41.67 |
| 12 | 20 | 33.69 |
| 13 | 21 | −39.58 |
| 14 | 23 | −52.10 |
| 15 | 24 | 80.71 |

[Numerical Data 4]

Unit: mm

Surface data

| Surface number | r | d | nd | vd |
|---|---|---|---|---|
| 1 | 223.541 | 6.85 | 1.80400 | 46.58 |
| 2 | −51.775 | 1.50 | 1.73800 | 32.26 |
| 3 | 56.579 | 0.20 | | |
| 4 | 33.983 | 7.65 | 1.95375 | 32.32 |
| 5 | 191.944 | 0.40 | | |
| 6* | 36.354 | 1.40 | 1.65412 | 39.68 |
| 7 | 23.649 | 9.58 | | |
| 8 | −80.008 | 1.30 | 1.66565 | 35.64 |
| 9 | 39.501 | 5.15 | 2.00100 | 29.13 |
| 10 | −883.910 | 2.04 | | |
| 11 (Stop) | ∞ | 4.14 | | |
| 12 | −70.654 | 8.52 | 1.59522 | 67.74 |
| 13 | −19.484 | 1.20 | 1.73800 | 32.26 |
| 14 | 317.429 | 0.20 | | |
| 15 | 68.670 | 9.16 | 1.76385 | 48.51 |
| 16 | −36.752 | 1.30 | 1.66565 | 35.64 |
| 17 | 128.305 | 1.21 | | |
| 18* | 177.452 | 7.40 | 1.88300 | 40.76 |
| 19* | −48.513 | (Variable) | | |
| 20 | 58.020 | 9.90 | 1.88300 | 40.76 |
| 21 | −44.927 | 1.43 | 1.66565 | 35.64 |
| 22 | 42.504 | 7.20 | | |
| 23 | −47.989 | 1.40 | 1.61340 | 44.27 |
| 24 | 65.040 | 5.00 | 1.85400 | 40.38 |
| 25* | −233.207 | (Variable) | | |
| Image plane | ∞ | | | |

Aspherical surface data

Sixth surface

K = 0.00000e+000   A4 = −3.21260e−006   A6 = −3.55131e−009
A8 = −8.76822e−012   A10 = 8.39780e−015

Eighteenth surface

K = 0.00000e+000   A4 = −4.66481e−006   A6 = −2.24063e−009
A8 = −2.58094e−012   A10 = 1.31311e−015

-continued

Unit: mm

Nineteenth surface

K = 0.00000e+000  A4 = −1.33031e−006  A6 = −2.62278e−009
A8 = −1.55136e−012

Twenty-fifth surface

K = 0.00000e+000  A4 = 3.57096e−006  A6 = 5.74477e−010
A8 = 1.72057e−012  A10 = 2.16305e−015

Various data

| | |
|---|---|
| Focal length | 49.66 |
| F-number | 1.24 |
| Half angle of view (degrees) | 23.54 |
| Image height | 21.64 |
| Total lens length | 108.64 |
| BF | 13.50 |

| | Infinity | Closest distance |
|---|---|---|
| d19 | 1.00 | 12.71 |
| d25 | 13.50 | 12.48 |

Lens group data

| Group | First surface | Focal length |
|---|---|---|
| LF | 1 | 121.98 |
| LR | 12 | 51.17 |

Lens unit data

| Unit | First surface | Focal length |
|---|---|---|
| L1 | 1 | 57.61 |
| L2 | 20 | 1,105.73 |

Single lens data

| Lens | First surface | Focal length |
|---|---|---|
| 1 | 1 | 52.87 |
| 2 | 2 | −36.42 |
| 3 | 4 | 42.30 |
| 4 | 6 | −108.16 |
| 5 | 8 | −39.56 |
| 6 | 9 | 37.88 |
| 7 | 12 | 42.55 |
| 8 | 13 | −24.84 |
| 9 | 15 | 32.57 |
| 10 | 16 | −42.78 |
| 11 | 18 | 43.82 |
| 12 | 20 | 30.03 |
| 13 | 21 | −32.60 |
| 14 | 23 | −44.81 |
| 15 | 24 | 60.01 |

TABLE 1

| Conditional Expression | Example 1 | 2 | 3 | 4 |
|---|---|---|---|---|
| (1) 1.0 < fLp/Dps < 2.0 | 1.472 | 1.240 | 1.239 | 1.466 |
| (2) 0.35 < Dps/Dsr < 0.85 | 0.584 | 0.653 | 0.664 | 0.611 |
| (3) −10.0 < fLn/Dns < −3.0 | −5.247 | −4.156 | −7.793 | −4.658 |
| (4) 1.85 < Npave < 2.00 | 1.908 | 1.920 | 1.905 | 1.920 |
| (5) 1.60 < Nnave < 1.75 | 1.686 | 1.670 | 1.680 | 1.686 |
| (6) 0.1 < fLp/ff < 0.5 | 0.290 | 0.237 | 0.339 | 0.433 |
| (7) −1.8 < fLp/fLn < −0.8 | −1.081 | −1.216 | −1.196 | −1.337 |
| (8) 0.1 < fr/ff < 0.5 | 0.267 | 0.226 | 0.351 | 0.419 |
| (9) 0.01 < f1/f2 < 0.30 | 0.101 | 0.105 | 0.072 | 0.052 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-032883, filed Feb. 27, 2018, which is hereby incorporated by reference herein in its entirety.

What is claimed is:

1. An optical system consisting of, in order from an object side to an image side:
   a front lens group;
   an aperture stop; and
   a rear lens group,
   wherein the front lens group includes at least one positive lens and at least one negative lens, the at least one positive lens including a positive lens Lp arranged closest to the object side in the front lens group, the at least one negative lens including a negative lens Ln arranged closest to the image side among the at least one negative lens, and
   wherein the following conditional expressions are satisfied:

$1.0 < fLp/Dps < 1.5;$ $0.35 < Dps/Dsr < 0.85;$ $-10.0 < fLn/Dns < -4.0;$ and $1.85 < Npave < 2.00,$ where fLp represents a focal length of the positive lens Lp, fLn represents a focal length of the negative lens Ln, Dps represents a distance on an optical axis from a lens surface on the object side of the positive lens Lp to the aperture stop, Dns represents a distance on the optical axis from a lens surface on the object side of the negative lens Ln to the aperture stop, Dsr represents a distance on the optical axis from the aperture stop to a lens surface closest to the image side in the rear lens group when the optical system is focused at infinity, and Npave represents an average value of refractive indices with respect to a d-line of materials of all the at least one positive lens included in the front lens group.

2. An optical system according to claim 1, wherein the following conditional expression is satisfied:

$1.60 < Nnave < 1.75,$ where Nnave represents an average value of refractive indices with respect to a d-line of materials of all the at least one negative lens included in the front lens group.

3. An optical system according to claim 1, wherein the following conditional expression is satisfied:

$0.1 < fLp/ff < 0.5,$ where "ff" represents a focal length of the front lens group.

4. An optical system according to claim 1, wherein the following conditional expression is satisfied:

$-1.8 < fLp/fLn < -0.8.$

5. An optical system according to claim 1, wherein the following conditional expression is satisfied:

$0.1 < fr/ff < 0.5,$ where "ff" represents a focal length of the front lens group, and "fr" represents a focal length of the rear lens group.

6. An optical system according to claim 1, wherein the front lens group, the rear lens group, and the aperture stop form a plurality of lens units, in which an interval between each pair of adjacent lens units among the plurality of lens units is changed during focusing.

7. An optical system according to claim 6, wherein the plurality of lens units consist of:
a first lens unit having a positive refractive power, which is configured to move toward the object side during focusing from infinity to a closest distance; and
a second lens unit having a positive refractive power, which is arranged on the image side of the first lens unit, and is configured not to move during focusing from infinity to the closest distance.

8. An optical system according to claim 6, wherein the plurality of lens units consist of:
a first lens unit having a positive refractive power, which is configured to move toward the object side during focusing from infinity to a closest distance; and
a second lens unit having a positive refractive power, which is arranged on the image side of the first lens unit, and is configured to move toward the image side during focusing from infinity to the closest distance.

9. An optical system according to claim 7, wherein the following conditional expression is satisfied:

$0.01 < f1/f2 < 0.30$, where f1 represents a focal length of the first lens unit, and f2 represents a focal length of the second lens unit.

10. An optical system according to claim 8, wherein the following conditional expression is satisfied:

$0.01 < f1/f2 < 0.30$, where f1 represents a focal length of the first lens unit, and f2 represents a focal length of the second lens unit.

11. An optical system according to claim 1, wherein the front lens group includes, in order from the object side to the image side, a first lens having a positive refractive power, a second lens having a negative refractive power, a third lens having a positive refractive power, and a fourth lens having a negative refractive power.

12. An image pickup apparatus comprising:
an optical system; and
an image pickup element configured to receive light of an image formed by the optical system,
wherein the optical system is an optical system including a plurality of lens units and an aperture stop,
wherein the plurality of lens units consists of:
a front lens group arranged on an object side of the aperture stop; and
a rear lens group arranged on an image side of the aperture stop,
wherein the front lens group includes at least one positive lens and at least one negative lens, the at least one positive lens including a positive lens Lp arranged closest to the object side in the front lens group, the at least one negative lens including a negative lens Ln arranged closest to the image side among the at least one negative lens, and
wherein the following conditional expressions are satisfied:

$1.0 < fLp/Dps < 1.5$;

$0.35 < Dps/Dsr < 0.85$;

$-10.0 < fLn/Dns < -4.0$; and $1.85 < Npave < 2.00$, where fLp represents a focal length of the positive lens Lp, fLn represents a focal length of the negative lens Ln, Dps represents a distance on an optical axis from a lens surface on the object side of the positive lens Lp to the aperture stop, Dns represents a distance on the optical axis from a lens surface on the object side of the negative lens Ln to the aperture stop, Dsr represents a distance on the optical axis from the aperture stop to a lens surface closest to the image side in the rear lens group when the optical system is focused at infinity, and Npave represents an average value of refractive indices with respect to a d-line of materials of all the at least one positive lens included in the front lens group.

* * * * *